Figure 2:
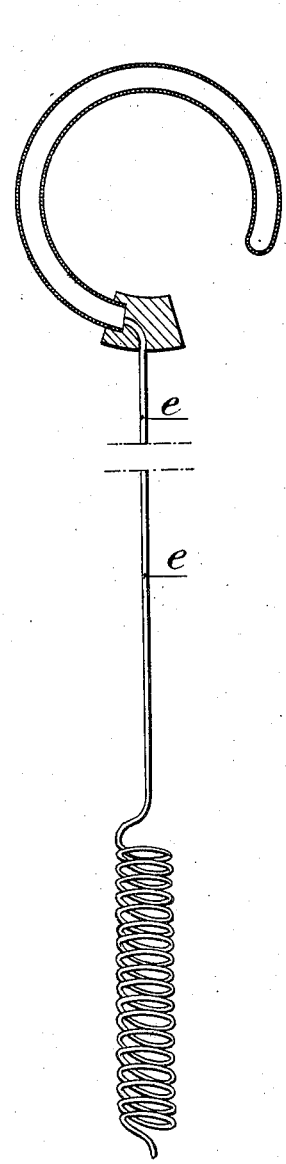

J. B. FOURNIER.
THERMOMETER UTILIZING TENSION OF VAPORS.
APPLICATION FILED MAY 3, 1909.

997,187. Patented July 4, 1911.

UNITED STATES PATENT OFFICE.

JOSEPH BARBE FOURNIER, OF PARIS, FRANCE.

THERMOMETER UTILIZING TENSION OF VAPORS.

997,187.  Specification of Letters Patent. Patented July 4, 1911.

Application filed May 3, 1909. Serial No. 493,661.

*To all whom it may concern:*

Be it known that I, JOSEPH BARBE FOURNIER, a citizen of the French Republic, and resident of Paris, France, have invented certain new and useful Improvements in Thermometers Utilizing the Tension of Vapors, of which the following is a specification.

The thermometers based upon the law of the tension of saturated vapors and particularly those which have to transmit or register at a distance the temperatures, must have only one part which is sensitive to the heat, viz.:—the plunging reservoir or explorer which is placed in the chamber or at the spot whose temperature is to be measured or registered. It is important that the sensitive substance, that is to say, the substance whose vapor serves to measure by its pressure the temperature, be prevented from escaping from the explorer reservoir. With this object in view this substance must not have any action or influence upon the motor or transmitting fluid; particularly it must not admix with said motor fluid nor dissolve or diffuse in the same. There are however frequent applications of the invention with which it is almost impossible to choose the sensitive substance and the motor fluid so that they answer the above stated conditions and requirements.

This invention has for its object to obviate this inconvenience by interposing in the explorer reservoir between the substance which is sensitive to the heat and the motor fluid an intermediate substance which separates said two substances and which possesses the property required of being absolutely without any influence upon either of said substances. With this object in view the explorer reservoir is divided into two compartments so that the sensitive substance or its vapor is prevented from penetrating into the one of said compartments, the motor fluid being prevented from penetrating into the other compartment. In this manner any contact between the sensitive substance and the motor fluid is rendered impossible. This invention therefore renders it possible to considerably extend the applications of these apparatuses and the limits of their functions. It especially renders it possible to use a gas as motor fluid and consequently to realize vertical transmissions at very great heights or depths. In fact, if the manometer is placed at the same level as the explorer reservoir the weight of the liquid contained in the motor tube has very little influence upon the indications of the apparatus, if however the manometer is placed very high above the explorer reservoir the small variations in the tension of the vapor become unimportant compared with the considerable weight of the liquid column so that the indications of the manometer cease to be sufficiently perceptible; therefore, it would be impossible to employ an apparatus of the ordinary type for indicating at the surface of the earth the temperature which prevails in the pit of a mine or for indicating at the foot of a mountain the temperature which prevails at its summit, and so forth. This invention further renders it possible to reduce the explorer reservoir to the volume of a capillary tube and consequently to realize instantaneous transmissions of the temperature.

In the accompanying drawing the preferred form of the invention is shown by way of example.

Figure 3:
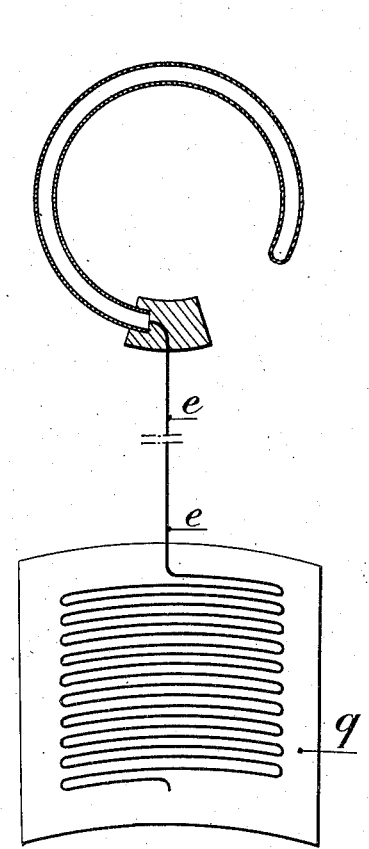
Figure 1:
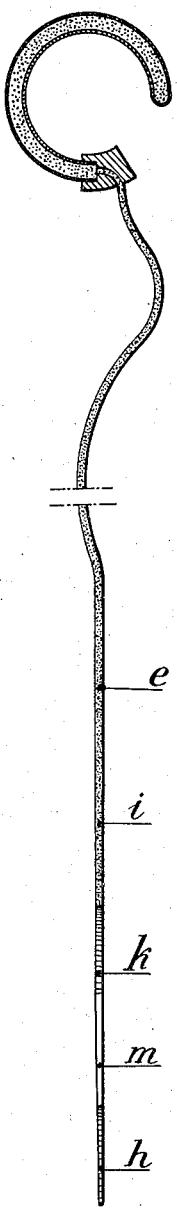

Figures 1, 2 and 3 represent thermometers designed for the instantaneous indication of temperatures.

The improved thermometer consists of a capillary tube $e$ closed at its lower end. This capillary tube serves as explorer at its lower closed end and as transmitter at its upper part. In the lower end of the capillary tube a sufficient quantity of sensitive substance $h$ is contained and further a sufficient quantity of intermediary substance $k$, said substances being separated by an empty space $m$. The upper part of the capillary tube $e$ is filled with the usual transmitting substance.

The intermediary substance $k$ can be solid or liquid and it must be of such nature that it is capable to fulfil the following three conditions:—1.—It must melt at a temperature which is inferior to the lowest temperature which has to be indicated by the apparatus. 2.—It must not have any chemical influence upon either the sensitive substance $h$ or the transmitting substance $i$. 3.—The tension of the vapor of said intermediary substance must be, within the limits of operation of the apparatus, as feeble as possible and in any case inferior to the tension of the sensitive substance $h$ and of the transmitter substance $i$. The sensitive substance $h$ and the motor liquid $i$ can therefore never come in contact. The substances $h$ and $i$ may therefore be of such a nature that they would otherwise combine, dissolve the one the other, admix or diffuse the one in the other. By way of example anilin is cited as a suitable sensitive substance $h$, glycerin as a suitable motor liquid $i$ and the fusible alloy of Dracet melting at 90° C. as intermediary substance $k$.

Owing to the small diameter of the tube $e$ the capillary forces are sufficient to maintain the intermediary substance $k$ between the sensitive substance $h$ and the motor substance $i$ so that these latter two substances are always separated by the intermediary substance $k$. In this manner an explorer of very small dimensions is obtained which is adapted to come very quickly to an equilibrium of temperature with the thermic spot into which it is plunged.

The capillary reservoir can, of course, be wound to form a spiral as shown in Fig. 2, the intermediary substance $k$ being imprisoned in this spiral so that within the limits of the function of the apparatus it never gets out of said spiral; under these conditions the sensitive part of the apparatus will always be limited to the spiral. Instead of being helicoidal as in Fig. 2, the said spiral could be plane as shown in Fig. 3 and soldered upon a metal plate $q$ which, being thin and flexible, is adapted to be applied upon a curved surface. An apparatus of this type enables the observer to instantaneously ascertain the temperature of such a surface.

As the improved thermometers have the object to localize at a determined part of the apparatus the vapor chamber which constitutes the sensitive part, instead of the three different substances namely the sensitive substance, the intermediary substance and the motor substance, only one single substance could be used for all three purposes. In this case the liquid substance would serve at the same time as transmitting and as sensitive substance and the transmitting tube $e$ would form the explorer reservoir.

I claim:—

Apparatus for transmitting at a distance by means of the pressure of saturated vapors, comprising in combination the explorer reservoir consisting of a capillary tube, the sensitive substance situated at the lower end of said capillary tube, the intermediary substance which becomes liquid at the temperature at which the apparatus works placed upon said sensitive substance and the transmitting substance situated above said intermediary substance in the upper part of said capillary tube, substantially as described and shown and for the purpose set forth.

In witness whereof I have hereunto set my hand in the presence of two witnesses.

JOSEPH BARBE FOURNIER.

Witnesses:
 DEAN B. MASON,
 ALFRED FREY.